United States Patent Office 3,485,869
Patented Dec. 23, 1969

3,485,869
PRODUCTION OF ORGANIC PEROXY ACIDS
Donald G. MacKellar, Trenton, John H. Blumbergs, Highland Park, and Rainer von Falkenstein, Princeton Junction, N.J., assignors to FMC Corporation, New York, N.Y., a corporation of Delaware
No Drawing. Filed Jan. 31, 1967, Ser. No. 612,787
Int. Cl. C07c 73/10
U.S. Cl. 260—502       3 Claims

ABSTRACT OF THE DISCLOSURE

Organic peroxycarboxylic acids were produced by reacting a first portion of their precursor acyl halides with an aqueous sodium peroxide solution, and subsequently adding a second portion of the acyl halides to the reaction mixture and reacting same with an aqueous potassium peroxide solution, wherein the active oxygen content of each of these peroxide solutions was at least about 1% by weight; both reactions were carried out in a common reaction medium comprising water and a tertiary alcohol having a water solubility of above about 5% by weight, followed by acidification of the reaction mixture to recover the peroxy carboxylic acid product.

BACKGROUND OF THE INVENTION

Field of the invention

The invention covers a process for producing organic peroxy acids by reaction of their precursor organic acyl halides with aqueous alkaline peroxide solutions.

Description of the prior art

One known method for producing organic peroxy acids is set forth in U.S. Patent 3,232,979 issued to John H. Blumbergs on Feb. 1, 1966. In this patented process a precursor acyl halide and an aqueous alkali metal peroxide solution, containing a mixture of potassium ions and sodium ions in a mole ratio of from about 1:1 to about 6:1, is reacted together in a medium comprising water and a tertiary alcohol having a water solubility above about 5% by weight. This reaction is illustrated by the following equation:

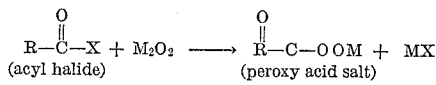

where R is an organic radical, X is a halogen atom and M is a mixture of the alkali metals Na and K. In the above reaction if the weight ratio of acyl halide to tertiary alcohol is from about 1:2.0 to about 1:5, and the weight ratio of acyl halide to the total reaction mixture is from about 1:8 to about 1:15; the final mixture, upon acidification, separates into a tertiary alcohol layer containing substantially all of the peroxycarboxylic acid and an aqueous layer containing the bulk of in-situ-produced inorganic salts and substantially no peroxycarboxylic acid.

When the above process is run with laboratory size samples, the reactants can be added within a few minutes, with adequate cooling, to prevent the exothermic reaction from exceeding about 5° C. Above about 5° C., decomposition of the resultant product becomes noticeable. The ensuing reaction is completed within about one hour and good yields of the product, on the order of about 90% or above, are obtained.

When scale-up of the process to commercial production is attempted, serious problems arise. Initially, the time required to complete the reaction materially increases to as long as 3–6 hours. This increase is largely due to the slow rate at which the reactants can be added together to prevent the temperature of the reaction mixture rising above 5° C. During scale-up it becomes increasingly more difficult to remove the heat of reaction from the reaction mixture as the amount of the mixture increases, even when special cooling means are employed. To avoid exceeding a temperature of 5° C. in the reaction mixture, the reactants are added at a rate no higher than that which will permit the cooling means to remove the exothermic heat of reaction.

At these longer reaction times an unexplained drop in the assay and yield of the product occurs. While the exact reason for the decrease in yield of the final product is unknown, the yield was consistently lower as the reaction time in the process was increased to accommodate the scaled-up, plant-sized reaction chambers used to produce the peroxycarboxylic acids.

As a result, there is a need for a method which will permit the scale-up of the above-described process in which longer reaction periods are required, without sacrifices in the yield and assay of the product.

SUMMARY OF THE INVENTION

We have now found that good yields of a peroxycarboxylic acid can be maintained when reacting an acyl halide of the desired peroxycarboxylic acid with sodium peroxide and potassium peroxide in a reaction medium comprising water and a tertiary alcohol having a water solubility of at least about 5% by weight, for periods up to about 6 hours, and the resulting reaction mixture is acidified by:

(a) Reacting an aqueous sodium peroxide solution (having an active oxygen content of at least about 1%) with about stoichiometric quantities of the precursor acyl halide in the presence of a reaction medium comprising water and a tertiary alcohol having a water solubility at least about 5% by weight, (b) Adding to said reaction mixture from (a), simultaneously, additional precursor acyl halide and an aqueous potassium peroxide solution (having an active oxygen content of at least about 1%) in about stoichiometric quantities, and (c) Employing a mole ratio of potassium to sodium in the final reaction mixture of about 1:1 to about 6:1, a weight ratio of the precursor acyl halide to said tertiary alcohol of about 1:2 to about 1:5, a weight ratio of the precursor acyl halide to the total reaction mixture of about 1:8 to about 1:15, (d) Acidifying said final reaction mixture, and (e) Separating a tertiary alcohol layer rich in peroxycarboxylic acid from a water layer poor in peroxycarboxylic acid and containing in-situ-produced inorganic salts.

DESCRIPTION OF THE INVENTION AND THE PREFERRED EMBODIMENTS

In carrying out the present process, separate aqueous sodium peroxide solutions and potassium peroxide solutions are prepared by mixing dilute solutions of sodium hydroxide and potassium hydroxide respectively with solutions of hydrogen peroxide. The potassium and sodium are employed in these separate solutions in a relative mole ratio of from about 1:1 to about 6:1, and preferably within a mole ratio of 1.5:1 to 2.5:1. The total sodium hydroxide and potassium hydroxide which is present in the separate solutions should be at least sufficient to form the equivalent alkali metal peroxides with the added hydrogen peroxide.

Alternately, aqueous sodium peroxide solutions and aqueous potassium peroxide solutions can be prepared by dissolving sodium peroxide or potassium peroxide, respectively, in water. In either method of preparation the resulting solutions are identical; however, the former method is preferred for economic reasons because sodium peroxide and potassium peroxide are relatively expensive.

The above described aqueous sodium peroxide mixture is then cooled and maintained at temperatures below 5° C. and preferably within a range of 0° C. to 5° C. While the subsequent reaction required to produce the peroxycarboxylic acid can be carried out at temperatures of from about −10° C. to about 20° C., temperatures higher than 5° C. are not desired because losses in product due to decomposition become unacceptable. To the cooled, aqueous, sodium peroxide mixture described above is added an aliphatic tertiary alcohol (having a water solubility of at least about 5% by weight) as a reaction promoter and solvent. Subsequently, the desired acyl halide is added slowly to the above mixture of aqueous sodium peroxide and aliphatic tertiary alcohol, with adequate cooling means, to prevent the exothermic reaction from raising the temperature of the mixture above about 5° C. The acyl halide is added in about stoichiometric amounts relative to the sodium peroxide solution.

During this addition some salts precipitate in the reaction mixture. It is believed that these include the sodium salts of the peroxycarboxylic acid. However, at the termination of the entire reaction these salts redissolve in the solution.

After substantially all of the sodium peroxide has reacted with the added acyl halide, there is added to the resulting reaction mixture, simultaneously, additional acyl halide and the previously prepared, aqueous, potassium peroxide solution. These reagents are added slowly, with adequate cooling means, to prevent the exothermic reaction from raising the temperature of the mixture above about 5° C. The aqueous, potassium peroxide solution may contain some tertiary alcohol in the same manner as the sodium peroxide solution, or if desired, all of the tertiary alcohol can be added initially to the sodium peroxide solution. In either case, the total tertiary alcohol is present in the final reaction mixture after all the potassium peroxide solution has been added.

The time required to add the reactants together and complete the reaction will vary depending upon the total quantity of reactants added, the extent of cooling means provided, and the uniformity of mixing in the reaction vessel. However, commercial batches can be prepared in from about 3 to about 6 hours. Upon completion of the reaction, any undissolved salts, such as the sodium or potassium salts of the peroxycarboxylic acid, redissolve, leaving a reaction mixture which is clear and contains little or no undissolved salt crystals. This reaction mixture is then acidified by the addition of an acid, desirably a mineral acid, such as sulfuric acid or phosphoric acid. The resulting acidified solution separates into an upper alcohol layer containing substantially all of the peroxycarboxylic acid and a lower aqueous layer containing substantially all of the inorganic salts produced in-situ.

While there is no intent to be bound by any explanation or theory of operation, it is believed that increased yields and assays of the peroxycarboxylic acid are obtained in the present process for the following reason. When the sodium peroxide solution and the added acyl halide are reacted together, it is believed that the intermediate product, the sodium salt of the corresponding peroxycarboxylic acid which is formed and which precipitates in part from the reaction mixture, is relatively stable and does not readily decompose in the alkaline reaction mixture. By contrast the corresponding potassium salt of the peroxycarboxylic acid is not believed to be as stable as its sodium counterpart. In the instant process the reaction between additional precursor acyl halide and the potassium peroxide solution to form the potassium salt of the peroxycarboxylic acid is carried out subsequent to the reaction of the sodium peroxide solution in order to minimize the length of time that the potassium salt is in contact with the alkaline reaction mixture. It is believed that the potassium salts of the peroxycarboxylic acid which precipitate during the reaction, and which remain undissolved in the alkaline reaction mixture, are subject to decomposition during long addition and reaction periods required in plant operations. Accordingly, it is critical to the present process that the potassium peroxide solution be added with the precursor acyl halide only after completion of the reaction of the added sodium peroxide solution and about stoichiometric quantities of the precursor acyl halide.

In the above process each of the aqueous alkali metal peroxide solutions should have an active oxygen content of about 1–3% by weight. Higher active oxygen contents can be employed. However, peroxide solutions having excessively high active oxygen contents should be avoided because they prevent the peroxycarboxylic acid salts from dissolving in the reaction mixture; substantially complete solution of these salts in the final reaction mixture is necessary to facilitate recovery of the peroxycarboxylic acid. When the active oxygen content of either the aqueous sodium peroxide solution or the aqueous potassium peroxide solution is lower than about 1% the precursor acyl halide may hydrolyze to the corresponding carboxylic acid and thus reduce the yield of the desired product. At active oxygen concentrations of above about 1%, the hydrolysis of the precursor acyl halide is substantially reduced.

The aliphatic tertiary alcohols which have been found effective as the reaction promoters in this process are those having water solubilities above about 5% by weight. The preferred tertiary aliphatic alcohols are tertiary butyl alcohol and tertiary amyl alcohol. The tertiary alcohol is employed in amounts of from about a 2.0:1 to about a 5:1 weight ratio with respect to the precursor acyl halide. Larger amounts of the tertiary alcohol beyond the weight ratio of 5:1 are not preferred, since the increase in the tertiary alcohol content is obtained at the expense of using smaller amounts of water. Reduced amounts of water in the reaction mixture results in precipitation of the inorganic salt residues in the final reaction mixture, making separation of the tertiary alcohol layer from the aqueous layer difficult. If the weight ratio of the tertiary alcohol to the precursor acyl halide is smaller than 2.0:1 there will be an insufficient amount of tertiary alcohol to dissolve the peroxycarboxylic acid product after acidification of the reaction mixture. The resulting insoluble crystals of the peroxy acid will prevent separation of the tertiary alcohol layer from the aqueous layer in the final reaction mixture; instead, a thick and unworkable slurry will result. Further, an insufficient amount of tertiary alcohol will not promote the reaction and will result in decreased yields. The preferred amounts of tertiary alcohol in the reaction mixture are in weight ratios of from about 2.25:1 to about 3:1 with respect to the precursor acyl halide.

The organic acyl halides which can be reacted according to this process are those containing aromatic, cycloaliphatic or aliphatic residues. These residues may be unsubstituted or substituted with groups such as halogens, $NO_2$, $C{\equiv}N$, or methoxy groups. The aromatic and cycloaliphatic residues can also be substituted with aliphatic groups. The acyl halides can be either mono-basic or dibasic. Monobasic carboxylic acid halides which can be employed include benzoyl chloride, isobutyryl bromide, naphthoyl chloride, octanoyl chloride, lauryl chloride, cyclohexanecarbonyl chloride and benzoyl bromide. Dibasic halides which can be employed includes succinyl chloride, phthalyl chloride, sebacyl chloride and adipyl chloride. In addition, substituted carboxylic acid halides which can be reacted according to this process include chlorobenzoyl chloride, α-chlorolauryl chloride, nitrobenzoyl chloride, cyanobenzoyl chloride, methoxybenzoyl chloride and methylbenzoyl bromide.

The organic acyl halide is added to the reaction mixture in a weight ratio of from about 1:8 to about 1:15 with respect to the total weight of the final reaction mixture. If weight ratios lower than 1:15 are employed, the final reaction mixture, upon acidification, does not separate completely into a tertiary alcohol layer and an aqueous layer. If weight ratios higher than 1:8 are employed, the reaction mixture becomes oversaturated and unable to solubilize the salts. The preferred ratio of acyl halide to the total reaction mixture is in a weight ratio of from about 1:8 to about 1:11.

At the commencement of the reaction, the reaction medium can either be homogeneous or heterogeneous depending upon the solubility of the tertiary alcohol in water. In the case of tertiary butyl alcohol, for example, the reaction medium will be homogeneous whereas the tertiary amyl alcohol, the reaction will be heterogeneous. During the major part of the reaction, some crystals of an intermediate product, such as benzyl peroxide, may remain suspended in the reaction mixture. This intermediate converts, during the reaction to the peroxycarboxylic acid salt; a portion of this salt remains insoluble during the reaction, but by the time the reaction has gone to completion it dissolves in the reaction medium. Accordingly, the final reaction mixture should be a liquid solution with little or no undissolved crystals.

The dissolved alkali metal salts of the peroxycarboxylic acid are then converted to peroxycarboxylic acid by acidification with an acid such as sulfuric acid or phosphoric acid. Upon acidification, the reaction mixture separates into two layers, a tertiary alcohol layer and a lower water layer. The major portion of the peroxycarboxylic acid formed in the reaction (generally over 95%) dissolves in the upper tertiary alcohol layer, while the inorganic salt residues produced in situ dissolve in the lower aqueous layer. The tertiary alcohol layer is then decanted from the aqueous layer.

In the event that the organic peroxycarboxylic acid which is formed is not stable in a pure dry state, it can be stored in the form in which it is recovered, i.e., as a tertiary alcohol solution. If this is done, however, the tertiary alcohol solution should be cleansed by washing it with a 25% solution of $NaH_2PO_4$ or other water-soluble acidic salt, e.g., $NaHSO_4$ or $KH_2PO_4$, which can form an aqueous solution having a specific gravity greater than that of the alcohol solution for ease of separation. Alternatively, a solution of a week acid, such as a 25% by weight aqueous phosphoric acid, can be employed to wash the alcohol solution. This washing removes the small amount of residual impurities present, such as unreacted hydrogen peroxide and inorganic potassium and sodium salts. In the absence of this washing, the tertiary alcohol does not stabilize the peroxy acid. If the organic peroxycarboxylic acid is stable in its dry state, it can be separated from the tertiary alcohol solvent by conventional means.

The following examples are given to illustrate the present invention and are not deemed to be limitative thereof.

EXAMPLE 1

Run A—Process of the invention

In a two liter, four neck, round bottom flask, equipped with a laboratory stirrer there was placed 15.7 grams of sodium hydroxide dissolved in 72 ml. of water containing 0.1 gram of a metal chelating agent. The solution was then cooled and maintained between 2° and 5° C. and there was added 13.6 grams of 50% hydrogen peroxide followed by 69 grams of tert-butanol. Thereafter, 29.2 grams of technical grade meta-chlorobenzoyl chloride, assaying 94.9%, was slowly added over a period of 60 minutes to the cooled solution while maintaining the temperature between 2° and 4° C.

A second solution was made up in a 500 ml. beaker by dissolving 50 grams of 85% potassium hydroxide in 144 ml. of water. The mixture was cooled to 4° C. and then there was added with stirring 27.2 grams of 50% hydrogen peroxide followed by 138 grams of tert-butanol. This mixture was maintained in an ice bath, with stirring, until used.

The above described second solution and 58.3 grams of meta-chlorobenzoyl chloride were then slowly added, simultaneously, in about stoichiometric ratios, into the two liter reaction flask containing the previous reaction mixture at a temperature of 2° to 4° C. over a period of 105 minutes. The mixture was subject to constant stirring and permitted to react at this temperature for an additional 45 minutes to complete the reaction. At the end of this period, the reaction mixture was acidified with a solution of 43.8 grams of 85% phosphoric acid in 71 ml. of water and then was transferred to a separatory funnel. The acidified reaction mixture separated into two sharp layers; the top layer, the tert-butanol layer, weighed 289 grams and contained 77.6 grams of meta-chloroperoxybenzoic acid. The bottom layer contained the bulk of the in situ produced inorganic salts dissolved in water. The tert-butanol layer was then separated from the remaining aqueous layer and the latter discarded. The tert-butanol layer was then slowly added into an aqueous pool maintained in the bottom of a laboratory distillation unit. The tert-butanol solution was distilled by the method set forth in Example 1, Run A of U.S. Patent 3,231,605. During the distillation the still was maintained under a pressure of about 30 mm. of mercury and the liquid pool of water in the still was maintained at a temperature of about 30° C. The meta-chloroperoxybenzoic acid which precipitated in the aqueous pool in the still was separated by filtration, dried in a vacuum oven under reduced pressure and then weighed. The assay of the product was determined by iodometric titration as described in Anal. Chem. 20, 1061 (1948); it showed that the meta-chloroperoxybenzoic acid product constituted a 90.0% yield based on the technical grade meta-chlorobenzoyl chloride utilized. The product assay was 92.6%; the remainder was substantially all meta-chlorobenzoic acid.

Run B—Process using a mixed sodium peroxide-potassium peroxide aqueous solution By way of comparison, a run was made similar to that of Run A except that the sodium peroxide and potassium peroxide were combined in a single, mixed, aqueous solution and used as the source of the alkali metal peroxide. In this run, 15.7 grams of sodium hydroxide, 50 grams of 85% potassium hydroxide and 0.1 gram of the same metal chelating agent as Run A were dissolved in 216 ml. of water contained in a two liter reaction flask. The mixture was cooled and maintained between 2° and 4° C., and there was added 40.8 grams of 50% hydrogen peroxide, followed by 207 grams of tert-butanol. Thereafter, 87.5 grams of technical grade meta-chlorobenzoyl chloride was slowly added over a period of 165 minutes to the cooled solution while maintaining the temperature between 2° and 5° C. The mixture was subject to constant stirring and permitted to react at this temperature for an additional 45 minutes to complete the reaction. The total time that the reaction mixture was in the alkaline stage was 3.5 hours, the same as in Run A. At the end of this period the reaction mixture was acidified as described in Run A and a tertiary butanol layer was separated weighing 283 grams and containing 67.4 grams of meta-chloroperoxybenzoic acid. The tertiary butanol layer was then subject to distillation by the same process set forth in Run A and 85 grams of a white crystal material was obtained having an assay of 77.9% of meta-chloroperoxybenzoic acid; the remainder was meta-chlorobenzoic acid. The yield of meta-chloroperoxybenzoic acid, based on the technical grade of meta-chlorobenzoyl chloride, was 78.3%.

EXAMPLE 2

Run A—Process of the invention

The same procedure was used as in Example 1, Run A except that the addition time of the initial 29.2 grams of meta-chlorobenzoyl chloride to the sodium peroxide solution was extended to 105 minutes. The remaining 58.3 grams of meta-chlorobenzoyl chloride was added over a period of 195 minutes along with the potassium peroxide mixture. The total time the reaction mixture was in the alkaline stage was 5.75 hours. After acidification of the reaction mixture and distillation of the tert-butanol layer, a crystalline product was recovered and identified as meta-chloroperoxybenzoic acid. The yield was 88.7% and the assay was 90.0%.

Run B—Process using a mixed sodium peroxide-potassium peroxide aqueous solution This run was carried out in the same manner as Example 1, Run B except that the total time the reaction mixture was in the alkaline stage was extended to 5.7 hours. The resultant meta-chloroperoxybenzoic acid product was obtained in 70.3% yield and 71.4% assay.

Pursuant to the requirements of the patents statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of producing a peroxycarboxylic acid by reaction of (a) the acyl halide of the peroxycarboxylic to be produced, with (b) sodium peroxide and potassium peroxide, wherein the potassium and sodium are in a mole ratio of about 1:1 to about 6:1, in a reaction medium comprising (c) water and a tertiary alcohol having a water solubility of above about 5% by weight, and wherein said mixture is acidified and a tertiary alcohol layer rich in said peroxycarboxylic acid is separated from a water layer poor in peroxycarboxylic acid and containing the in situ produced inorganic salts, the improvement which comprises (1) reacting an aqueous sodium peroxide solution, having an active oxygen content of at least about 1%, with about stoichiometric quantities of said acyl halide in the presence of a reaction medium comprising water and a tertiary alcohol having a water solublility of at least about 5% by weight, (2) adding to said reaction mixture from (1), simultaneously, additional amounts of said acyl halide and an aqueous potassium peroxide solution having an active oxygen content of at least about 1%, in about stoichiometric quantities, (3) employing a mole ratio of potassium to sodium in the fnal reaction mixture of about 1:1 to about 6:1, a weight ratio of said acyl halide to said tertiary alcohol of about 1:2 to about 1:5, and a weight ratio of said acyl halide to the total reaction mixture of about 1:8 to about 1:15, (4) acidifying said final reaction mixture, (5) separating a tertiary alcohol layer rich in said peroxycarboxylic acid from a water layer poor in said peroxycarboxylic acid containing the in situ produced inorganic salts and (6) wherein the process is carried out for a period of from about three to about six hours.

2. Process of claim 1 in which the tertiary alcohol in said reaction medium (C) is tert-butanol, said weight ratio of said acyl chloride (A) to said tert-butanol is from about 1:2.25 to about 1:3, said weight ratio of said acyl halide (A) to the total reaction mixture is from about 1:8 to 1:11, and the mole ratio of said potassium ions to said sodium ions in the final reaction mixture is from about 1:5:1 to about 2.5:1.

3. Process of claim 1 in which said peroxycarboxylic acid is meta-chloroperoxycarboxylic acid.

References Cited

UNITED STATES PATENTS 3,232,979  2/1966  Blumbergs _____ 260—502

FOREIGN PATENTS 1,016,356  1/1966  Great Britain.

BERNARD HELFIN, Primary Examiner

W. B. LONE, Assistant Examiner

UNITED STATES PATENT OFFICE
CERTIFICATE OF CORRECTION

Patent No. 3,485,869              Dated December 23, 1969

Inventor(s) Donald G. MacKellar et al

It is certified that error appears in the above-identified patent and that said Letters Patent are hereby corrected as shown below:

Column 1, line 47, "R-$\overset{O}{\underset{\|}{C}}$" should read --R-$\overset{O}{\underset{\|}{C}}$--.

Column 8, line 30, "1:5:1" should read --1.5:1--.

SIGNED AND
SEALED
FEB 9 1971

(SEAL)
Attest:

Edward M. Fletcher, Jr.
Attesting Officer

WILLIAM E. SCHUYLER, JR.
Commissioner of Patents